United States Patent Office 3,551,519
Patented Dec. 29, 1970

3,551,519
EPOXY RESIN COMPOSITIONS CONTAINING
VINYL COMPOUNDS AND CHELATES
George Jon Dubsky, London, and Bernard Peter Stark,
Stapleford, Cambridge, England, assignors to Ciba
Limited, Basel, Switzerland, a company of Switzerland
No Drawing. Continuation-in-part of application Ser. No.
362,993, Apr. 27, 1964. This application May 20, 1968,
Ser. No. 730,600
Claims priority, application Great Britain, May 1, 1963,
17,277/63
Int. Cl. C08g 45/04
U.S. Cl. 260—836                                2 Claims

ABSTRACT OF THE DISCLOSURE

Hardenable compositions may be prepared from an epoxy resin containing more than one 1,2-epoxy group per molecule and a vinyl compound having a 3,4-dihydro-2H-pyran nucleus, with at least one chelate compound in which the coordinating atom is bound by one or more of its valences to a halogen atom and by one or more of its valences to an oxygen or sulfur atom. In an example 90 parts of a polyglycidyl ether of bisphenol A were reacted with 10 pts. of (3,4-dihydro-2H-pyran-2-yl)methyl 3,4-dihydro-2H-pyran-2-carboxylate and 2 parts of a complex prepared from the treatment of 10 pts. of acetoacetanilide with 40 ml. of boron trifluoride diethyl etherate. The product was a hard infusible resin.

This application is a continuation-in-part of our application, Ser. No. 362,993, filed Apr. 27, 1964 now abandoned.

This invention relates to hardenable epoxy resin compositions and to processes for the hardening of such compositions.

The present invention provides hardenable compositions comprising (a) more than 10 mol percent, calculated on the combined amounts of components (a) and (b), of an epoxide compound or mixture of epoxide compounds containing an average of more than one 1,2-epoxide group per molecule, (b) a compound or mixture of compounds containing no 1,2-epoxide group but capable of being transformed to a higher molecular weight material under the inuence of a cationic catalyst, and (c) at least one chelate compound in which the co-ordinating atom is bound by one or more of its valences to a fluorine, chlorine or bromine atom and by one or more of its valences to an oxygen or sulphur atom.

The epoxide compounds containing on average more than one 1,2-epoxide group per molecule which may be used in the compositions of the invention include, for example, polyglycidyl ethers of polyhydric alcohols such as butane-1,4-diol or glycerol, or of polyhydric phenols such as resorcinol, pyrocatechol, hydroquinone, 1,4- and 1,5-dihydroxynaphthalenes, bis(4 - hydroxyphenyl)methane, bis(4 - hydroxyphenyl)methylphenylmethane, bis(4 - hydroxyphenyl)tolylmethanes, 4,4′-dihydroxydiphenyl, bis-(4-hydroxyphenyl)sulphone and 2,2-bis(4-hydroxyphenyl)propane (bisphenol A) and condensation products of aldehydes with phenols (novolaks); polyglycidyl esters of polycarboxylic acids such as phthalic acid; aminopolyepoxides such as are, for example, obtained by the dehydrohalogenation of the reaction products of epihalohydrins and primary or secondary amines such as n-butylamine, aniline or bis(4-methylaminophenyl)methane; and the polyepoxides which are obtained by the complete or incomplete epoxidation of ethylenically-unsaturated cyclic or acyclic olefins and polyolefins. Preferred epoxide compounds are the polyglycidyl ethers of bisphenol A which are liquid at room temperature and which have an epoxide content of about 3.8 to 5.88 epoxide equivalents per kilogram.

The compounds which may be transformed into higher molecular weight materials under the influence of a cationic catalyst, component (b) in the compositions of the present invention, may be divided into three main classes.

The first class comprises compounds containing one or more groups which render the compounds capable of undergoing homo- or co-polymerisation under the influence of cationic catalysts. Such groups include for example ethylenic double bonds, heterocyclic rings such as oxetane rings, tetrahydrofuran rings or cyclic formals, acetals or ketals. Examples of compounds containing ethylenic double bonds are: simple olefins such as amylenes and hexylenes, tetramethylethylene, diisobutylene, etc., and ethylene, propylene, but-1-ene, but-2-ene, isobutylene, though the latter are not preferred because of their volatility, halogen-containing olefins such as 3,3,3-trifluoropropene and 2-methyl-3,3,3-trifluoropropene; cycloolefins such as cyclopentene, cyclohexene, bicyclo-(2,2,1)-hepta-2,5-diene, dicyclopentadiene, and acenaphthylene; vinyl- or allyl derivatives of alicyclic, carbocyclic, or heterocyclic compounds such as 4-vinylcyclohex-1-ene, styrene, α-methylstyrene, α-p-dimethylstyrene, allylbenzene, 2,6-dimethyl-4-t-butylstyrene, divinylbenzene, p-isopropenyltoluene, vinyldiphenyl, vinylpyrene, N-vinyl-2-pyrrolidone, 2 - vinyldibenzofuran, N - vinylpyrrole, N-vinylcarbazole, and 2-vinylfuran, vinyl ethers such as vinyl methyl ether, vinyl isobutyl ether, vinyl isoamyl ether, vinyl phenyl ether, vinyl hexyl ether, vinyl tetrahydrofurfuryl ether, and vinyl ethers of di- or polyhydroxy compounds such as ethylene glycol divinyl ether, compounds containing two conjugated ethylenic bonds, such as 2,3-dimethylbutadiene, alkoxyprenes, cyclopentadiene, methylcyclopentadiene, and butadiene, isoprene, piperylene, though the last three are not preferred because of their volatility, butadienyl ethers such as butadienyl methyl ether, butadienyl butyl ether etc., cyclic or acyclic terpenes such as allo-ocimene, ocimene, myrcene, α- and β-pinenes, dipentene, limonene, and squalene.

Other unsaturated compounds in this class include: unsaturated fatty acids and their esters, anethole, indene, compounds containing norbornene units, allyl esters and ethers, acrylonitrile other derivatives (such as esters and amides) of acrylic or methacrylic acids, acetylenic compounds, drying oils and the corresponding fatty acids, α,β-unsaturated ketones and aldehydes, stilbene, vinyl sulphides, vinyl acetals, formals and ketals, vinylphosphonates, vinyl halides, N-vinylamines, and N-vinylsultams.

Compounds containing heterocyclic rings which may be polymerised include: oxetanes such as oxacyclobutane, 3, 3-bis-(chloromethyl)-1-oxacyclobutane, 3-hydroxymethyl-3 - methyl - 1-oxacyclobutane, 3 - hydroxymethyl - 3-ethyl-1 - oxacyclobutane, 3,3 - bis-(hydroxymethyl) - 1-oxacyclobutane, 2-methyl-1-oxacyclobutane, 3,3-dimethyl-1-oxacyclobutane, perfluoroalkyloxetanes, 3-alkoxy-3-halomethyl - 1 - oxacyclobutanes, 3-methyl-3-chloromethyl-1-oxacyclobutane, 3 - hydroxymethyl - 3 - halomethyl-1-oxacyclobutanes, and 3,3-bis(bromomethyl) - 1 - oxacyclobutane; compounds containing more than one oxetane group per molecule may also be used in the composition of the invention. These include, for example: 2,6-dioxaspiro(3,3)heptane, reaction products of di- or polyfunctional phenolates with 3-alkyl-3-halomethyl 1-oxacyclobutanes, reaction products of dioxaspiroheptane with dicarboxylic acids or their anhydrides, and the esters of di- or poly-carboxylic acids with 3-alkyl-3-hydroxymethyl-1-oxacyclobutanes. Compounds containing, besides one or more oxetane groupings, an additional different group rendering the compounds capable of undergoing cationic polymerisation may also be used. Such compounds include for example the esters of 3-alykl-3-hydroxymethyl-1-oxacyclobutanes with acrylic acid.

Other heterocyclic compounds capable of polymerisation under cationic conditions include: compounds containing one or more tetrahydrofuran rings such as tetrahydrofuran and tetrahydrofurfuryl alcohol and its esters with mono- or polycarboxlic acids or its ethers with alcohols; cyclic vinyl ethers such as 2-vinyl-1,4-dioxan or compounds containing one or more dihydrofuran or dihydropyran rings: 1,3,-dioxalanes or other cyclic acetals, trioxan, trithiane, cyclic lactones, thiophen derivatives, benzofuran, 1,4-dioxan, ethyleneimine derivatives, cyclic phosphites, cyclic organosilicon compounds, and diketene.

Aldehydes such as acrolein dimer and furfural may also be used as compounds capable of transformation to higher molecular weight materials in the compositions of the invention, as also may be isocyanates, iminocarbonates and nitriles. Aldehydes such as formaldehyde, acetaldehyde and acrolein may also be emplyed but are not proferred because of their volatility.

The second class of compounds falling within the definition of component (b) comprises those compounds which, under the influence of a cationic cataylst, liberate volatile materials with consequent formation of higher molecular weight material. Such compounds include, for example, compounds containing one or more aromatic rings bearing one or more halomethyl groups from which a hydrogen halide may be eliminated to give higher molecular weight compounds possessing methylene bridges between their aromatic nuclei. Yet other compounds such as alkyl ketones may, under the influence of cationic catalysts, liberate water to give high molecular weight compounds.

The third general class of compounds within the definition of component (b) comprises those compounds or mixtures of compounds in which a functional group from one molecule may be caused to react with a different functional group of another molecule under the influence of a cationic catalyst. In such cases, high molecular weight materials will result when either a single molecule contains at least one functional group of each kind, or when two or more compounds are present, each of which contains at least two functional groups capable of reacting with the different functional groups of the other compound or compounds. Examples are compounds containing both norbornene rings and hydroxl groups, and mixtures of compounds such as cyclic acetals formed from α,β-unsaturated aldehydes and polyhydric alcohols with polyhydroxylic compounds.

The preferred transformable compounds which may make up component (b) in the compositions of the invention are compounds containing one or more vinyl groups directly attached to an aromatic nucleus, especially styrene or a divinylbenzene and compounds containing at least two vinyl ether groups, especially cyclic vinyl ether groups, and more particularly those wherein the cyclic ether groups each form part of a 3,4-dihydro-2H-pyran nucleus.

According to a preferred embodiment of the invention, the chelates used in the compositions in the present invention conform to the general Formula I:

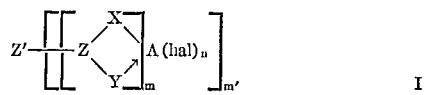

wherein A represents a coordinating atom, hal represents a fluorine, chlorine or bromine atom, X represents oxygen or sulphur, Y represents oxygen or sulphur doubly bonded to Z, or nitrogen, the remaining valencies of the nitrogen atom, if a nitrogen atom be present, being satisfied either by a divalent atom or group, such as an alkylene group, or by two monovalent atoms or groups such as hydrogen atoms, hydrocarbyl groups or acyl groups, or, as to one valency, by linkage to one such monovalent atom or group, and, as to the remaining valency, by forming part of a double bond joined to an atom present in Z, Z represents an organic group linking the atoms X and Y such that the number of consecutive atoms linking X and Y is not less than 2 nor more than 4, $m$ represents 1, 2 or 3, $n$ is an integer from 1 to 4, and Z' is hydrogen or an organic or metal-containing organic group of valency $m'$, where $m'$ is 1 or 2.

The coordinating atom A may be, for example, boron, in which case hal is preferably fluorine, or aluminium, zinc, ferric, iron, stannic tin, zirconium, vanadium, titanium, or antimony in which case hal is preferably chlorine. A is preferably boron or aluminium.

An especially preferred class of chelate compounds useful in the compositions of the present invention conforms to the general Formula II:

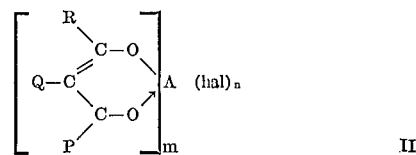

wherein A represents a coordinating atom, hal represents fluorine, chlorine or bromine, P, Q and R represents hydrogen or halogen or monovalent organic residues with the provision that any two of P, Q and R may together represent a single divalent organic residue, and one of P, Q and R may be a divalent residue joining two residues of the general formula given above omitting one of P, Q and R, $n$ is an integer from 1 to 4, and $m$ is 1, 2 or 3, the value of $2m+n$ being the coordination number of the atom A. In Formula II P, Q and R may, for example, represent aliphatic, cycloaliphatic, araliphatic, or aromatic hydrocarbon residues, alkyl or alkoxy groups, acyloxy groups, or alkylamino or acylamino groups. Preferably P represents hydrogen, alkyl of 1 to 6 carbon atoms, phenyl, acyloxyphenyl, halophenyl, phenylamino, or halophenylamino, or a phenylene-bisamino radical joined to two radicals of the formula:

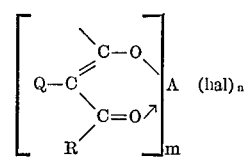

Q represents hydrogen or an alkyl, alkenyl, or alkoxycarbonyl radical of 1 to 6 carbon atoms, or an aralkyl radical, and R represents hydrogen or an alkyl radical of 1 to 6 atoms or a phenyl radical, or any two of P, Q and R together represent a tri- or tetra-methylene radical and P, Q or R (as the case may be) is as first defined.

The most preferred compounds of Formula II are those in which P is methyl or ethyl, Q is hydrogen, and R is a monofunctional group, e.g. an alkyl group of 1 to 6 carbon atoms, a phenyl or arylamino group.

Examples of preferred compounds within the class of Formula II are those of the structures:

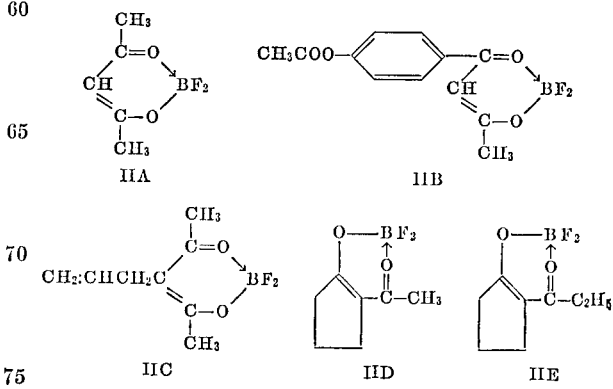

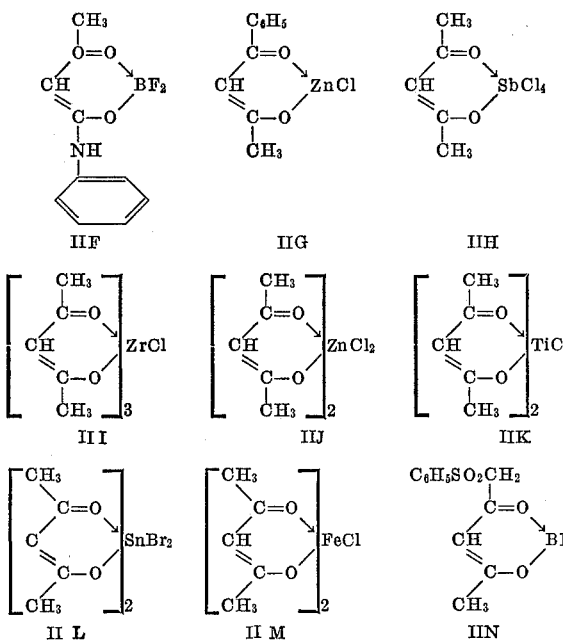

Another especially preferred class of chelate compounds useful in the compositions of the present invention conforms to the general Formula III:

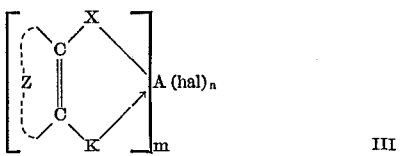

wherein A represents a coordinating atom, hal represents chlorine, fluorine or bromine, X represents oxygen or sulphur, Z with the two adjacent carbon atoms represents an aromatic nucleus which may be substituted and may be joined to a second

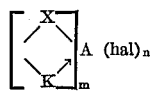

unit via a second pair of vicinal carbon atoms, R represents an organic radical containing an oxygen, sulphur, or nitrogen atom coordinated to atom A and joined, either directly or via a single other atom, to the indicated carbon atom of the aromatic nucleus, n is an integer from 1 to 4 and n is 1, 2 or 3, the value of $2m+n$ being the coordination number of the atom A. Z with the two adjacent carbon atoms preferably represents a benzene or naphthalene residue and K is preferably an acyl or alkoxycarbonyl radical of 1 to 6 carbons, a nitroso or nitro group, a carboxylic acid group, an acylamino group of 1 to 6 carbons, an aracylamino group, or a —$CR^1$:$NR^2$ group (where $R^1$ is hydrogen or an alkyl group of 1 to 6 carbons and $R^2$ is an aryl group).

The most preferred compounds of Formula III are those in which X is oxygen, Z with the two adjacent carbon atoms represents a benzene residue, and K is acetyl, methoxycarbonyl, or nitro.

Examples of preferred compounds within the class of general Formula III are those of the structures:

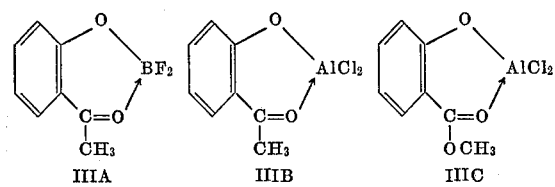

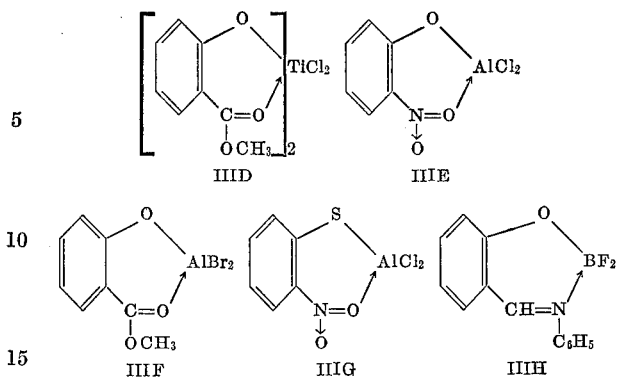

Chelates containing more than one coordinating atom, such as the complex formed by the reaction between nickel dimethylglyoxime and boron trifluoride, and those formed between 2 molecules of a halide containing the coordinating atom and one molecule of an ortho, ortho'-disubstituted methylene-bisphenol in which the two ortho-substituents may be the same or different and have the same meanings as are assigned above to K in Formula III, may also be used in the hardenable compositions of the invention.

The chelate compounds of general Formula I may be regarded as being formed by the elimination of hydrogen halide from a halide of the coordinating atom and a chelating substance. Examples of chelate-forming substances are phenols substituted in the ortho-position by a group K where K is as hereinbefore defined and diketones, especially β-diketones. Suitable ortho-substituted phenols include o-hydroxyacetophenone, o-nitrophenol, 2,4-dinitrophenol, 1-nitroso - 2 - naphthol, o-nitrothiophenol, o-hydroxyacetanilide, salicyclic acid, salicyclic aldehyde, and methyl salicylate. Suitable β-diketones include benzoylacetene, p-acetoxybenzoylacetone, acetylacetone, dibenzoylmethane, hexane-2,4-dione, heptane-2,4-dione, dipropionylmethane, dicaproylmethane, 2-acetylcyclohexanone, and 3-alkyl- or 3-alkenyl-pentane-2,4-diones, such as 3-allyl-pentane-2,3-dione.

The invention includes within its scope a process for the hardening of epoxy resins which comprises heating a hardenable composition of the invention with or without a second hardener. The invention further comprises cured products obtained by this process.

The chelate components (c) may be present in the compositions of the invention in an amount of 0.01 to 20% based on the combined weights of components (a) and (b), and in making the compositions they may, if desired, be dissolved in either component (a) or (b) or in any additional hardener which may be present, or in a mixture of one or both of components (a) and (b) and the additional hardener. Alternatively the chelate components (c) may first be dissolved in a solvent, e.g. γ-butyrolactone or trialkyl phosphate, before admixture with component (a) or (b) and (when present) the additional hardener.

The conventional hardeners which may, if desired, be included in the compositions of this invention include amines and amides, e.g. aliphatic and aromatic primary, secondary and tertiary amines, such as mono-, di- and tri-butylamine, p-phenylenediamine, bis-(p-aminophenyl) methane, ethylenediamine, diethylenetriamine, tetra-(hydroxyethyl)diethylenetriamine, triethylenetetramine, tetraethylenepentamine, trimethylamine, diethylamine, triethanolamine, Mannich bases, piperidine, guanidine and guanidine derivatives, such as phenylguanidine and diphenylguanidine, dicyandiamide, aniline - formaldehyde resins, urea-formaldehyde resins, melamine-formaldehyde resins, polymers of amino-styrenes, and polyamides, e.g. those which are obtained from aliphatic polyamines and di- or tri-merised unsaturated fatty acids; isocyanates; isothiocyanates; polyhydric phenols, such as resorcinol, hydroquinone and bis(4 - hydroxyphenyl)dimethylmethane; p-benzoquinone; phenol-aldehyde resins and oil-modified phenol-aldehyde resins; reaction products of aluminium alcoholates or phenolates with tautomerically-reacting compounds of the acetoacetic ester type; and phosphoric acid. The preferred hardeners are polycarboxylic acids and their anhydrides, such for example as phthalic anhydride, methylendomethylenetetrahydrophthalic anhydride, dodecenylsuccinic anhydride, hexahydrophthalic anhydride, hexachloroendomethylenetetrahydrophthalic anhydride and endomethylenetetrahydrophthalic anhydride and their mixtures and maleic and succinic anhydrides.

The compositions of this invention may also contain fillers, plasticizers or colouring agents, for example, asphalt, bitumen, glass fibres, mica, quartz powder, cellulose, kaolin, kieselguhr, finely divided silica such as that available under the registered trade mark Aerosil, or metal powder.

The compositions may be used in the filled or unfilled state, e.g. in the form of solutions or emulsions, as textile auxiliaries, laminating resins, varnishes, lacquers, dipping resins, casting resins, moulding compositions, and encapsulating, coating, filling, and packing materials, adhesives and the like, as well as for the preparation of such materials.

In the examples, the chelate compounds used were as follows:

Complex 1 was prepared, as described in J. Org. Chem. 1962, 27, 1253, by the reaction of boron trifluoride with a mixture of benzenesulphonylacetone, acetic acid and acetic anhydride; when recrystallised from chloroform it had M.P. 133–135° C. and the following elementary analysis—
Calculated for $C_{11}H_{11}SO_4BF_2$ (percent): C, 45.60; H, 3.87; S, 11.21. Found (percent): C, 45.47; H, 3.89; S, 11.45.

Complex 2 was prepared by the treatment of acetoacetanilide (10 g.) with boron trifluoride diethyl etherate (40 ml.) as described in J. Amer. Chem. Soc. 1948, 70, 1971, the complex being obtained as a white solid of M.P. 152–154° C.

Complex 3 was prepared as a mobile brown liquid by addition of boron trifluoride diethyl etherate (1 mole) to a slowly-distilling solution of 2-methylnonane-4,6-dione (1 mole) in toluene. When evolution of hydrogen fluoride has ceased the mixture was cooled, washed with water and the solvent removed in vacuo from the washed organic solution.

Complex 4, pentane-2,4-dionoaluminium dichloride, was prepared as described in J. Amer. Chem. Soc., 1959, 81, 4213.

"Epoxy resin A" was prepared in a known way by the reaction of 2,2-bis(4-hydroxyphenyl)propane with epichlorohydrin under alkaline conditions; it had an epoxy value of 5.2 equivalents per kg.

"Epoxy resin B" consisted essentially of the compound of formula:

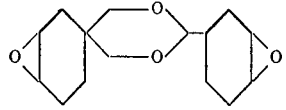

prepared in the manner described in British patent specification No. 870,696.

In the examples, the Martens values were obtained (except where indicated) by a modification of the Martens D.I.N. test in which a smaller sample is used. These values, while not identical with those obtained by the original procedure, are mutually comparable. "P.b.w." denotes "parts by weight."

EXAMPLES 1–57

The mixtures prepared, the conditions of curing, and the results obtained are shown in the following table.

TABLE

| Example No. | Notes | Component (a) Epoxy Resin | Component (a) Pbw. | Component (b) Name | Component (b) Pbw. | Component (c) Complex | Component (c) Pbw. | Other additives Name | Other additives Pbw. | Cure cycle | Martens value, °C. | Flexural strength (VSM), kg./mm.² | Impact strength (VSM), cm. kg./cm.² |
|---|---|---|---|---|---|---|---|---|---|---|---|---|---|
| 1 | 1, 2 | A | 10 | Styrene | 0.77 | 1 | 0.53 | | | 3 days/20° C. plus 2 hours/100° C. | | | |
| 2 | 2 | A | 10 | bis(Tetrahydrofurfuryl)adipate | 2.5 | 1 | 0.63 | | | do | | | |
| 3 | 3, 2 | A | 9 | 3-ethyl-3-hydroxymethyl-1-oxacyclobutane | 1 | 2 | 0.5 | | | 12 days/20° C. | | | |
| 4 | 2, 2 | A | 9 | Tetrahydrofurfurylalcohol | 1 | 2 | 0.5 | | | do | | | |
| 5 | 3 | A | 100 | Styrene | 7.7 | 2 | 5 | | | 72 hours/80° C. | 90 | | |
| | | | | | | | | | | 4 hours/120° C. | 56 | | |
| | | | | | | | | | | 16 hours/120° C. | 85 | | |
| 6 | 3 | A | 100 | bis(Tetrahydrofurfuryl)adipate | 25 | 2 | 5 | | | 72 hours/80° C. | 53 | | |
| | | | | | | | | | | 4 hours/120° C. | 46 | | |
| | | | | | | | | | | 16 hours/120° C. | 54 | | |
| 7 | 1, 2 | A | 100 | bis(1-oxa-3-ethylcyclobut-3-yl)-methyl)adipate | 30 | 1 | 5 | | | 1 day/40° C. | 40 | | |
| 8 | 1, 2 | B | 100 | do | 30 | 1 | 5 | | | 16 hours/40° C. plus 2 hours/100° C. | 55 | | |
| 9 | 1, 2 | B | 100 | bis(Tetrahydrofurfuryl)adipate | 30 | 1 | 5 | Triethylamine | 0.2 | 1 day/40° C. | 40 | | |
| 10 | 1, 2 | B | 100 | do | 30 | 1 | 5 | | | 1 day/40° C. | 95 | | |
| | | | | | | | | | | 4 days/15° C. | 50 | | |
| 11 | 3 | A | 10 | Styrene | 0.77 | 2 | 5 | Triethylamine | 0.2 | 7 days/15° C. | 40 | | |
| | | | | | | | | | | 16 hours/120° C. | 70 | | |
| 12 | 3 | A | 10 | do | 13.4 | 2 | 5 | | | do | 56 | | |
| 13 | 3 | A | 10 | do | 20.0 | 2 | 5 | | | do | 72 | | |
| 14 | 3 | A | 10 | bis(Tetrahydrofurfuryl)adipate | 11.1 | 2 | 5 | | | do | 54 | | |
| 15 | 3 | A | 10 | do | 25.0 | 2 | 5 | | | do | 93 | 10.8 | 6.9 |
| 16 | 4, 5 | A | 200 | bis((1-oxa-3-ethylcyclobut-3-yl)-methyl)phthalate | 40 | 3 | 5 | | | 20 hours/120° C. plus 8 hours/180° C. | 73 | 11.4 | 10.0 |
| 17 | 4, 5 | A | 200 | do | 40 | 3 | 5 | | | 20 hours/120° C. plus 24 hours/180° C. | 73 | 12.7 | 7.9 |
| 18 | 5 | A | 160 | do | 80 | 3 | 5 | | | 20 hours/120° C. plus 8 hours/180° C. | 51 | 10.6 | 6.4 |
| 19 | 5 | A | 160 | do | 80 | 3 | 5 | | | 20 hours/120° C. plus 24 hours/180° C. | 56 | 12.3 | 5.5 |
| 20 | 5 | A | 120 | do | 80 | 3 | 5 | | | 20 hours/120° C. plus 8 hours/180° C. | | | |
| 21 | 5 | A | 120 | do | 80 | 3 | 5 | | | 20 hours/120° C. plus 24 hours/180° C. | | | |

See footnotes at end of table.

TABLE—Continued

| Example No. | Notes | Component (a) Epoxy Resin | Pbw. | Component (b) Name | Pbw. | Component (c) Complex | Pbw. | Other additives Name | Pbw. | Cure cycle | Martens value, °C. | Flexural strength (VSM), kg./mm.² | Impact strength (VSM), cm. kg./cm.² |
|---|---|---|---|---|---|---|---|---|---|---|---|---|---|
| 22 | 5 | A | 80 | bis(1-oxa-3-ethylcyclobut-3-yl)-methyl)phthalate | | 3 | | | 5 | 20 hours/120° C. plus 8 hours/180° C. | 40 | 9.0 | 3.4 |
| 23 | 5 | A | 80 | do | | 3 | | | 5 | 20 hours/120° C. plus 24 hours/180° C. | 41 | 9.4 | 3.76 |
| 24 | 1, 2 | A | 18 | Diisobutylene | | 2 | 0.27 | | | 24 hours/20° C. plus 21 hours/80° C. plus 18 hours/120° C. | 50 | | |
| 25 | | A | 18 | Cyclohexene | | 2 | 0.27 | | | do | 41 | | |
| 26 | 1, 2, 7 | A | 18 | Divinylbenzene and ethyl vinyl benzene | | 2 | 0.27 | | | do | 60 | | |
| 27 | 1, 1, 2 | A | 18 | α-Pinene | | 2 | 0.27 | | | do | 46 | | |
| 28 | 1, 1, 2 | A | 18 | β-Pinene | | 2 | 0.27 | | | do | 46 | | |
| 29 | 1, 1, 2 | A | 18 | Myrcene | | 2 | 0.27 | | | do | 81 | | |
| 30 | 1, 1, 2 | A | 18 | Diallyl phthalate | | 2 | 0.27 | | | do | 63 | | |
| 31 | 1, 1, 2 | A | 18 | Crotonaldehyde | | 2 | 0.27 | | | do | 94 | | |
| 32 | 1, 1, 2 | A | 18 | Dioxalan | | 2 | 0.27 | | | do | 74 | | |
| 33 | 1, 1, 2 | A | 18 | Valerolactone | | 2 | 0.8 | | | do | 65 | | |
| 34 | 1, 1, 2 | A | 18 | Furfural | | 2 | 0.8 | | | do | 89 | | |
| 35 | 1, 1, 2 | A | 18 | 3-ethyl-3-hydroxymethyl-1-oxacyclobutane | | 2 | 0.8 | | | do | 128 | | |
| 36 | 1, 1, 2 | A | 18 | 4-vinylcyclohex-1-ene | | 2 | 0.8 | | | do | 80 | | |
| 37 | 1, 1, 2 | A | 18 | 3,9-divinyl-2,4,8,10-tetraoxaspiro(5,5)-undecane | | 2 | 0.8 | | | do | 90 | | |
| 38 | 1, 1, 2 | A | 18 | Benzyl chloride | | 2 | 0.8 | | | do | 64 | | |
| 39 | 1, 1, 2 | A | 18 | Dicyclopentadiene | | 2 | 0.8 | | | do | 81 | | |
| 40 | 1, 1, 2 | A | 18 | α-Methylstyrene | | 2 | 0.8 | | | do | 71 | | |
| 41 | 1, 1, 2 | A | 18 | Glycerol disorbate | | 2 | 0.8 | | | do | 76 | | |
| 42 | 1, 1, 2 | A | 18 | Bicyclo(2,2,1)hept-5-en-2-ol | | 2 | 0.8 | | | do | 86 | | |
| 43 | 1, 1, 2 | A | 18 | Bicycloheptenyl ethyl succinate | | 2 | 0.8 | | | do | 75 | | |
| 44 | 1, 1, 2 | A | 18 | Bicyclo(2,2,1)hept-2-ene | | 2 | 0.8 | | | do | 76 | | |
| 45 | 1, 1, 2 | A | 18 | Bicyclo(2,2,1)hepta-2,5-diene | | 2 | 0.8 | | | do | 71 | | |
| 46 | 1, 1, 2 | A | 18 | Linseed oil | | 2 | 0.8 | | | do | 109 | | |
| 47 | 1, 1, 2 | A | 18 | Butyl vinyl ether | | 2 | 0.8 | | | do | 65 | | |
| 48 | 1, 1, 2 | A | 18 | trans-Stilene | | 2 | 0.8 | | | do | 83 | | |
| 49 | 1, 1, 2 | A | 18 | N-vinylcarbazole | | 2 | 0.8 | | | do | 114 | | |
| 50 | 1, 1, 2 | A | 18 | Limonene | | 2 | 0.8 | | | do | 65 | | |
| 51 | 1, 1, 2 | A | 18 | Trioxan | | 2 | 0.8 | | | do | 76 | | |
| 52 | 1, 1, 2 | A | 18 | Propyl sorbate | | 2 | 0.8 | | | do | 75 | | |
| 53 | 1, 1, 2 | A | 18 | Acrolein dimer | | 2 | 0.8 | | | do | 105 | | |
| 54 | 1, 1, 2 | A | 90 | (3,4-dihydro-2H-pyran-2-yl)methyl 3,4-dihydro-2H-pyran-2-carboxylate | | 10 | 2 | | | 120° C./3 hours | 57 | | |
| 55 | 1, 8 | A | 18 | do | | 4 | 0.8 | | | 20° C./overnight plus 120° C./24 hours | 47 | | |
| 56 | 1, 7, 9 | A | 18 | Divinylbenzene and ethyl vinylbenzene | | 4 | 0.8 | | | do | 48 | | |
| 57 | 1, 1, 2 | A | 18 | Styrene | | 4 | 0.8 | | | do | 50 | | |

NOTE:
1. Catalyst was used as a 33% w./w. solution in γ-butyrolactone.
2. Product was a hard infusible resin.
3. Catalyst was used as a 40% w./w. solution in γ-butyrolactone.
4. For comparison.
5. Martens value quoted was determined by the D.I.N. method.
6. Sample decomposed during post-cure.
7. A 50% solution of a commercially-available mixture of isomeric divinyl benzene in a commercially-available mixture of isomeric ethyl vinyl benzene was used as component (b).
8. Product was a clear yellow, hard, infusible resin.
9. Product was a translucent yellow, hard, infusible resin.

What is claimed is:

1. A composition of matter comprising (1) more than 10 mol percent, calculated on the combined amounts of components (1) and (2) of a 1,2-epoxide compound having a 1,2-epoxy equivalency greater than 1, (2) a compound selected from the group consisting of (3,4-dihydro-2H - pyran - 2-yl) methyl 3,4-dihydro-2H-pyran-2-carboxylate and prepolymers thereof and (3) a chelate compound of the formula

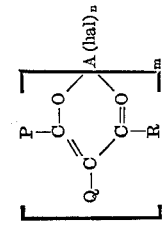

wherein A is a coordinating atom selected from the class consisting of boron, aluminum, gallium, indium, zinc, titanium, zirconium, tin$^{IV}$, iron$^{III}$, vanadium$^{IV}$ and antimony$^V$, "hal" is a halogen atom selected from the class consisting of fluorine, chlorine and bromine, P is a member selected from the class consisting of alkyl group of 1 to 6 carbon atoms and the phenyl group, Q is a member selected from the class consisting of hydrogen atom, alkyl group of 1 to 6 carbon atoms, alkenyl group, benzyl group and (2-carbomethoxy) alkyl group, R is a member of the class consisting of alkyl group of 1 to 6 carbon atoms, the phenyl group, the acetoxy-phenyl group, the group

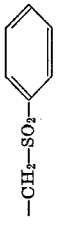

$-CH_2-SO_2-$ and the group

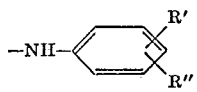

wherein R′ and R″ each is a member of the class consisting of hydrogen and chlorine, and together Q and R form a member selected from the class consisting of trimethylene group and tetramethylene group, $m$ is an integer of at least 1 and at the most 4, the value of $2m+n$ being the coordination member of the atom A.

2. A composition of matter comprising (1) more than 10 mol percent, calculated on the combined amounts of components (1) and (2) of a 1,2-epoxide compound having a 1,2-epoxy equivalency greater than 1, (2) a compound selected from the group consisting of (3,4-dihydro-2H - pyran - 2 - yl)methyl 3,4-dihydro-2H-pyran-2-carboxylate and prepolymers thereof and (3) a chelate compound of the formula

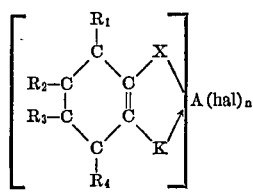

wherein A is a coordinating atom selected from the class consisting of boron, aluminum, gallium, indium, zinc, titanium, zirconium, tin$^{IV}$, iron$^{III}$, vanadium$^{IV}$, and antimony$^{V}$, "hal" is a halogen atom selected from the class consisting of fluorine, chlorine and bromine, X is a member selected from the class consisting of oxygen and sulfur, K is a member selected from the class consisting of nitro group, nitroso group, the carboxyl group, the group

a group

a group

a group

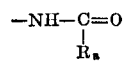

and a group

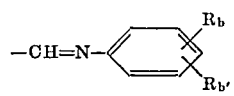

$R_a$ being an alkyl group of at least 1 and at the most 2 carbon atoms, $R_b$ and $R_b'$ each being selected from the class consisting of hydrogen, halogen and alkyl, $R_1$, $R_2$, $R_3$ and $R_4$ each is a member selected from the class consisting of hydrogen, alkyl group and nitro group, and together $R_2$ and $R_3$ form the divalent radical

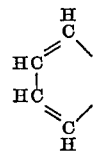

$m$ is an integer of at least 1 and at the most 3, $n$ is an integer of at least 1 and the most 4, the value of $2m+n$ being the coordination number of the atom A.

References Cited

UNITED STATES PATENTS

| | | | |
|---|---|---|---|
| 3,099,638 | 7/1963 | Foster | 260—837 |
| 3,424,699 | 1/1969 | Strak et al. | 260—47 |

FOREIGN PATENTS

| | | | |
|---|---|---|---|
| 106,179 | 1/1963 | Czechoslovakia | 260—837 |
| 623,245 | 4/1963 | Belgium | 260—837 |

PAUL LIEBERMAN, Primary Examiner

U.S. Cl. X.R.

260—2, 18, 37, 47, 51, 88.3, 93.5, 830, 831, 834, 837

PO-1050
(5/69)

UNITED STATES PATENT OFFICE
CERTIFICATE OF CORRECTION

Patent No. 3,551,519           Dated   December 29, 1970

Inventor(s) George John Dubsky et al

It is certified that error appears in the above-identified patent and that said Letters Patent are hereby corrected as shown below:

Column 11, line 11, "member" should be -- number --.

Signed and sealed this 2nd day of November 1971.

(SEAL)
Attest:

EDWARD M. FLETCHER, JR.
Attesting Officer

ROBERT GOTTSCHALK
Acting Commissioner of Paten